United States Patent [19]
Sawamoto et al.

[11] Patent Number: 5,657,734
[45] Date of Patent: Aug. 19, 1997

[54] FUEL EVAPORATIVE-GAS EMISSION PREVENTING APPARATUS

[75] Inventors: Hiroyuki Sawamoto, Kasugai; Naohiro Asada, Aichi-ken; Katsuyuki Kido, Seto, all of Japan

[73] Assignee: Toyota Jidosha Kabushiki Kaisha, Toyota, Japan

[21] Appl. No.: 547,345

[22] Filed: Oct. 24, 1995

[30] Foreign Application Priority Data

Dec. 13, 1994 [JP] Japan .................................. 6-309225
Jul. 27, 1995 [JP] Japan .................................. 7-191656

[51] Int. Cl.$^6$ ........................................ F02M 37/04
[52] U.S. Cl. ............................ 123/519; 123/516
[58] Field of Search .......................... 123/518, 519, 123/520, 521, 516, 198 D; 220/89.1

[56] References Cited

U.S. PATENT DOCUMENTS

| | | | |
|---|---|---|---|
| 4,135,562 | 1/1979 | Martineau et al. | |
| 4,659,346 | 4/1987 | Uranishi et al. | |
| 4,701,198 | 10/1987 | Uranishi | 123/519 |
| 4,714,172 | 12/1987 | Morris | |
| 4,790,283 | 12/1988 | Uranishi | 123/519 |
| 4,869,283 | 9/1989 | Oeffling et al. | |
| 4,872,439 | 10/1989 | Sonoda et al. | |
| 4,917,157 | 4/1990 | Gifford | 123/519 |
| 4,958,655 | 9/1990 | Danek | 123/516 |
| 5,036,823 | 8/1991 | MacKinnon | 123/516 |
| 5,183,087 | 2/1993 | Aubel | 123/518 |
| 5,215,132 | 6/1993 | Kobayashi | 123/518 |
| 5,472,836 | 12/1995 | Hyodo | 123/519 |

FOREIGN PATENT DOCUMENTS

| | | | |
|---|---|---|---|
| 55-015376 | 7/1953 | Japan . | |
| 60-122218 | 8/1985 | Japan . | |
| 1132763 | 6/1986 | Japan | 123/519 |
| 62-194936 | 8/1987 | Japan . | |
| 2-012927 | 1/1990 | Japan . | |
| 3-042426 | 4/1991 | Japan . | |
| 5-1547 | 1/1993 | Japan . | |

Primary Examiner—Carl S. Miller
Attorney, Agent, or Firm—Cushman, Darby & Cushman IP Group of Pillsbury Madison & Sutro LLP

[57] ABSTRACT

A fuel evaporative-gas emission preventing apparatus capable of reducing the quantity of adsorption of a canister as low as possible by a single breather at any fueling speeds and allowing emissions to fall within given limits. One end of the breather is coupled to a portion near a port of an inlet pipe for a fuel tank and a differential pressure regulating valve is connected to the other end of the breather. The canister is coupled to the differential pressure regulating valve. An opening-area variable device is provided at an intermediate portion of the breather and adjusts the quantity of a fuel evaporative-gas in the breather according to an internal pressure of the fuel tank.

26 Claims, 16 Drawing Sheets

FUEL EVAPORATIVE-GAS EMISSION PREVENTING APPARATUS

BACKGROUND OF THE INVENTION

1. Field of the Invention

The present invention relates to a fuel evaporative-gas emission preventing apparatus, and particularly to a fuel evaporative-gas emission preventing apparatus suitable for use in a fuel tank mounted in a vehicle such as a motor vehicle or the like.

2. Description of the Related Art

As a fuel tank mounted in a vehicle such a motor vehicle or the like, there has heretofore been known one equipped with a fuel evaporative-gas emission preventing apparatus which allows a canister to adsorb a fuel evaporative-gas (vapor) generated within the fuel tank. As one example, there is known one described in Japanese Utility Model Application Laid-Open No. 55-15376.

As shown in FIG. 13, this type of fuel evaporative-gas emission preventing apparatus has a breather 74 for coupling the inside of a fuel tank 70 and an opening or port 72A of an inlet pipe 72 to one another. Upon fueling, some of a fuel evaporative-gas in the fuel tank 70 is circulated from the breather 74 to the port 72A of the inlet pipe 72 by using an increase in internal pressure of the fuel tank 70 to thereby reduce the quantity of intake of fresh air from the outside of the inlet pipe 72 to the port 72A, whereby the quantity of generation of vapor can be restrained. As a result, the total quantity of fuel evaporative-gases generated until the time when the fuel tank 70 is fully provided with fuel, can be reduced and a size reduction of a canister 78 connected to an upper portion of the fuel tank 70 by a vapor line 78 can be achieved.

In the fuel evaporative-gas emission preventing apparatus, a purge flow-rate control valve 90 for varying a flow-passage sectional area according to the output of an atmospheric pressure sensor 88 is provided in the course of a line 80 for coupling the canister 78 and a purge port 88 provided on the upstream side of a throttle valve 84 of a carburetor 82 to one another. Therefore, when a sufficient purge flow rate can be ensured even when the atmospheric pressure is reduced. Thus, a canister having a capacity substantially identical to that of a canister used at a flatland can be used even at a highland. The purge flow-rate control valve 90 is coupled to an intake manifold 98 by an intake negative-pressure Supply line 92 through a check valve 94 and an orifice 96 disposed in a direction of preventing a negative pressure on the purge flow-rate control valve 90 side from reduction.

However, when the fuel tank 70 is fueled at a low speed (e.g., 15 liter/min as a typical value) corresponding to a normal fueling speed or a high speed (e.g., 38 liter/min as a typical value) in this type of fuel evaporative-gas emission preventing apparatus, variations in tank internal pressure relative to a fueling time are shown in FIG. 14. Namely, when the fuel tank 70 is fueled at the high speed (38 liter/min), the internal pressure of the fuel tank 70 at the time that the breather 74 is provided, becomes low as compared with the case where no breather 74 is provided. Further, when the breather 74 is provided, the internal pressure of the fuel tank 70 becomes low if the diameter Φ of the breather 74 is increased. This is because the quantity of the fuel evaporative-gas circulated in the breather 74 increases, the quantity of intake of fresh air from the outside of the inlet pipe 72 to the port 72A is reduced and no new fuel evaporative-gas is generated within the fuel tank 70.

Namely, if the fueling speeds are of the same, then the total quantity of air of intake from the port 72A of the inlet pipe 72 is identical in either case. Some percent of the total quantity of intake air becomes a fuel evaporative-gas in place of fresh air owing to the provision of the breather 74. Since the high fueling speed (38 liter/min) increases the quantity of intake of fresh air as compared with the low fueling speed (15 liter/min) when the fueling speed is changed under the same breather diameter (Φ 3 mm), the quantity of a fuel evaporative-gas generated in the fuel tank 70 increases to raise the pressure in the fuel tank 70.

If the fueling speed is of the low speed (15 liter/min) when the breather diameter Φ is 3 mm, then the quantity of a fuel evaporative-gas generated by the intake of fresh air becomes 0 g/liter as shown in FIG. 15. Thus, since the intake of fresh air is substantially not produced, no new fuel evaporative-gas is generated. Further, the difference between the quantity of a fuel evaporative-gas generated by the intake of fresh air in the absence of the breather (when the breather diameter Φ is 0 mm) and the quantity of the fuel evaporative-gas generated (0 g/liter), a so-called breather effect becomes 0.11 g/liter (=0.11−0). On the other hand, when the fueling speed is of the high speed (38 liter/min), the quantity of a generated fuel evaporative-gas is 0.4 g/liter and a breather effect becomes 0.14 g/liter (0.54−0.4).

Thus, the breather effect can be obtained even if the fueling speed is changed. However, when the diameter of the breather is small, the quantity of the generated fuel evaporative-gas increases on the high fueling speed side. It is thus necessary to increase the capacity of the canister 78.

If the fueling speed is of the high speed (38 liter/min) when the breather diameter Φ is 6 mm, then the quantity of the generated fuel evaporative-gas is 0.14 g/liter and the breather effect becomes a large value, i.e., 0.4 g/liter (=0.54−0.14). On the other hand, when the fueling speed is less than or equal to 29 liter/min, the quantity of the generated fuel evaporative-gas becomes 0 g/liter or less. This shows that a vapor leak from the port 72A of the inlet pipe 72 occurs due to an excess in the quantity of the fuel evaporative-gas. Thus, the breather effect becomes great as the diameter of the breather increases but the vapor leak takes place on the low fueling speed side. The vapor leak simply occurs during a minimal time from the commencement of fueling to the completion of fueling, whereas the vapor leak is brought to about 0 when fueling.

When the number of breathers is one even in the case of any breather diameters as described above, the optimum quantity of fuel evaporative-gas, i.e., the quantity of intake of fresh air cannot be achieved to about 0 at all normal gasoline feed speeds.

When the fueling speed is of a high speed (38 liter/min), an increase in breather diameter allows a reduction in the quantity of adsorption of a canister as shown in FIG. 16. This is similar even when the fueling speed is of a low speed (15 liter/min).

However, when the fueling speed is of a high speed (38 liter/min), a variation in emission is small even if the breather diameter is increased, as shown in FIG. 17. On the other hand, when the fueling speed is of a low speed (15 liter/min), an emission exceeds a controlled or restricted value if the breather diameter Φ exceeds about 4 mm. Namely, when the breather diameter is small, the quantity of adsorption of the canister is increased so that the capacity of the canister becomes large.

Data about graphs illustrated in FIGS. 14 through 17 show data tested in conformance with the conditions of The Environmental Protection Agency under a fuel-tank capacity of 70 liters, a room temperature of 26.7° C., a tank temperature of 26.7° C. and a supply fuel temperature of 19.4° C.

A problem arises that since the required breather diameter varies according to the fueling speed in this way, the single breather is insufficient to reduce the quantity of adsorption of a canister as low as possible at any fueling speeds and to allow the emission to fall within the restricted value.

As techniques related to the present invention, there have been known a technique described in Japanese Patent Application Laid-Open No. 82-194938 wherein a liquid seal and a negative pressure for fuel injection enables prevention of fuel vapor from being discharged out of a fueling port, a technique described in Japanese Utility Model Application Laid-Open No. 2-12927 wherein the flow of fuel vapor from a fuel tank to a vent tube permits prevention of the fuel vapor from being ejected out of a fueling port, a technique described in Japanese Utility Model Application Laid-Open No. 3-42428 wherein a liquid seal and a negative pressure for fuel injection permits prevention of fuel vapor from being discharged out of a fueling port, and techniques described in U.S. Pat. Nos. 4,714,172 and 4,135,562.

SUMMARY OF THE INVENTION

With the foregoing in view, it is therefore an object of the present invention to provide a fuel evaporative-gas emission preventing apparatus capable of reducing the quantity of adsorption of a canister by a single breather at any fueling speeds and allowing an emission to fall within a restricted value.

According to a first aspect of the present invention, there is provided a fuel evaporative-gas emission preventing apparatus comprising: a fuel tank; a breather for coupling the inside of a fuel tank and a neighborhood of a fuel-feed port of the fuel tank; a canister for adsorbing a fuel evaporative-gas generated within the fuel tank; and fuel evaporative-gas quantity varying means for varying a quantity of a fuel evaporative-gas circulated in the breather so as to be substantially identical to a quantity of intake of air into the fuel tank by fueling.

According to the present aspect, since the fuel evaporative-gas quantity varying means varies the quantity of the fuel evaporative-gas circulated in the breather so as to be substantially identical to the quantity of intake of air into the fuel tank by fueling, a vapor leak from the fuel-supply port and the intake of fresh air in the fuel tank can be restrained. Therefore, the quantity of adsorption of the canister can be reduced as low as possible by the single breather at any fueling speeds and an emission can be also set so as to fall within a restricted value.

In this case, the fuel evaporative-gas quantity varying means can be interposed in the breather. Further, the fuel evaporative-gas quantity varying means can be used as a breather ventilation resistance varying means for varying a ventilation resistance of the breather. The breather ventilation resistance varying means may be used as an opening-area varying means for varying an area of an opening defined in the breather according to an internal pressure in the fuel tank. In addition, the opening-area varying means may be used as a valve. Furthermore, the opening-area varying means may be composed of a pipe having a small-diameter portion near at least one end thereof and an inclined face; and a float valve accommodated in the pipe.

According to a second aspect of the present invention, there is provided a fuel evaporative-gas emission preventing apparatus comprising: a fuel tank; a breather for coupling the inside of the fuel tank and a neighborhood of a fuel-supply port of the fuel tank to each other; a canister for adsorbing a fuel evaporative-gas generated within the fuel tank; a vapor line for coupling the fuel tank and the canister to each other; and vapor line ventilation resistance varying means for varying a ventilation resistance of the vapor line so that a quantity of a fuel evaporative-gas in the breather is substantially identical to a quantity of intake of air into the fuel tank by fueling.

In short, in contrast to the first aspect, the vapor lines for coupling the fuel tank and the canister to each other are further provided and the vapor line ventilation resistance varying means is provided as an alternative to the fuel evaporative-gas quantity varying means.

The vapor line ventilation resistance varying means varies the ventilation resistance of each vapor line so that the quantity of the fuel evaporative-gas circulated in the breather is substantially identical to the quantity of intake of air in the fuel tank. The vapor line ventilation resistance varying means varies the ventilation resistance of the vapor line according to the inflow rate of fuel (the quantity of intake of air). Accordingly, an internal pressure in the fuel tank changes and the quantity of the fuel evaporative-gas circulated in the breather is adjusted so as to be substantially identical to the quantity of intake of air in the fuel tank by fueling. Therefore, a vapor leak from the fuel-supply port and the intake of fresh air in the fuel tank are restrained. According to the present aspect as described above, since the fuel evaporative-gas quantity varying means varies the ventilation resistance of the vapor line, the same effects as those obtained in the first aspect can be brought about.

According to a third aspect of the present invention, there is provided a fuel evaporative-gas emission preventing apparatus comprising: a fuel tank; a breather for coupling the inside of the fuel tank and a neighborhood of a fuel-feed port of the fuel tank to each other; a canister for adsorbing a fuel evaporative-gas generated within the fuel tank; a vapor line for coupling the fuel tank and the canister to each other; and fuel evaporative-gas quantity varying means for varying a quantity of a fuel evaporative-gas circulated in the breather so as to be substantially identical to a quantity of intake of air into the fuel tank by fueling; and vapor line ventilation resistance varying means for varying a ventilation resistance of the vapor line so that the quantity of the fuel evaporative-gas circulated in the breather is substantially identical to the quantity of intake of air into the fuel tank by fueling.

In short, in contrast to the first aspect, the vapor line ventilation resistance varying means for varying the ventilation resistance of the vapor line so that the quantity of the fuel evaporative-gas in the vapor line for coupling the fuel tank and the canister to each other and the breather is substantially identical to the amount of intake of air in the fuel tank by fueling, is further provided. Thus, since the breather ventilation resistance varying means and the vapor line ventilation resistance varying means are provided, the quantity of the fuel evaporative-gas can be promptly varied.

The above and other objects, features and advantages of the present invention will become apparent from the following description and the appended claims, taken in conjunction with the accompanying drawings in which preferred embodiments of the present invention are shown by way of illustrative example.

DETAILED DESCRIPTION OF THE PREFERRED EMBODIMENTS (First embodiment)

A first embodiment of a fuel evaporative-gas emission preventing apparatus according to the present invention will be described with reference to FIGS. 1 and 2. The term "UP" indicated by arrow in the accompanying drawings shows an upward direction of a vehicle.

Figure 1:
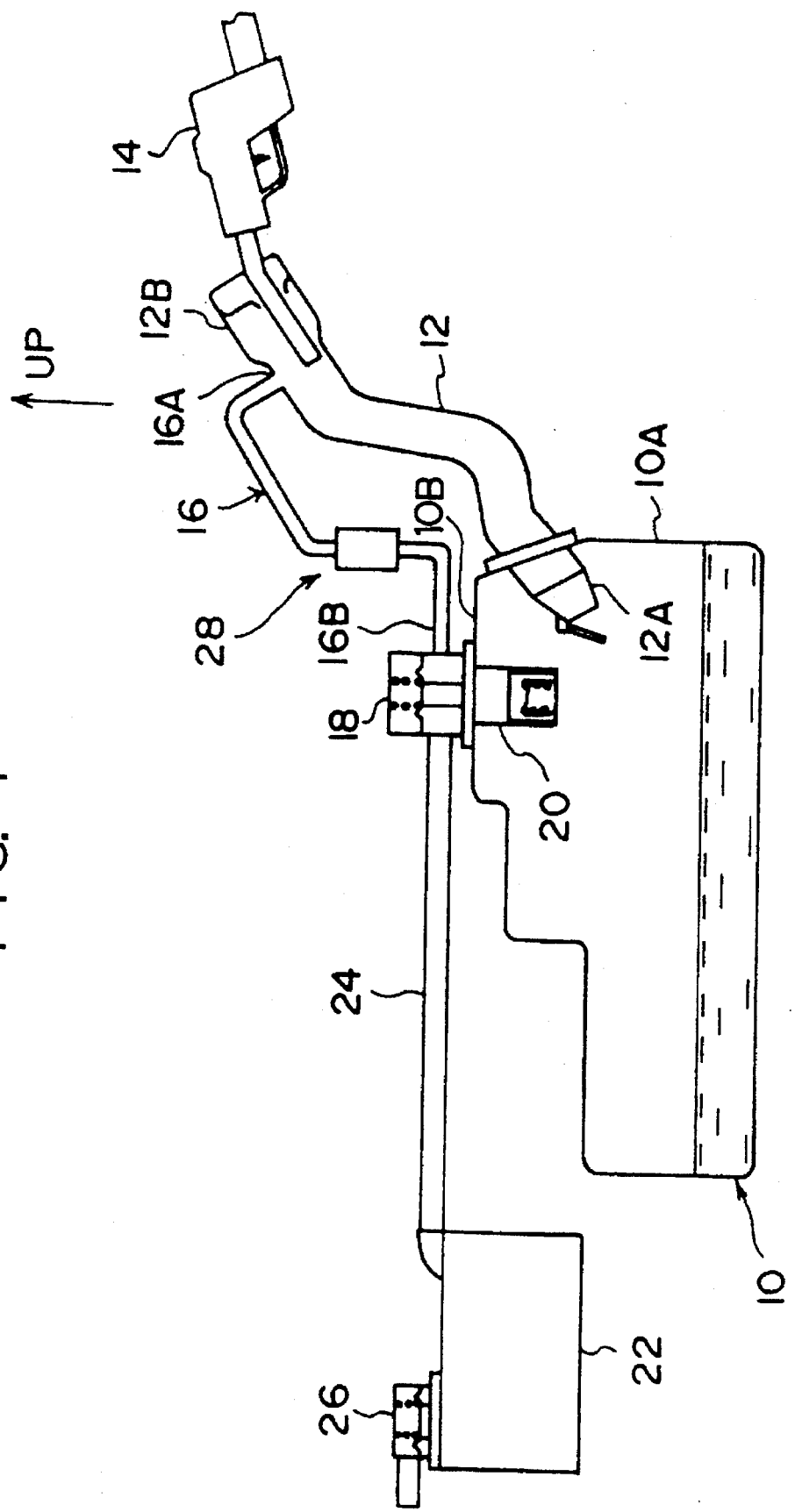
FIG. 1 is block diagram showing a fuel evaporative-gas emission preventing apparatus according to a first embodiment of the present invention.

As shown in FIG. 1, an inlet pipe 12 extends through a side wall portion 10A of a fuel tank 10. A tip portion 12A of the inlet pipe 12 is inserted into the fuel tank 10. Upon fueling, one end 16A of a breather 16 is coupled to a portion near a port or opening 12B of the inlet pipe 12 in which a fuel-feed gun 14 is inserted. The other end 16B of the breather 16 is coupled to a differential pressure regulating valve 18 mounted on an upper wall portion 10B of the fuel tank 10. A valve unit 20, which is used both as a float valve and a rollover valve, is mounted to a lower part of the differential pressure regulating valve 18. The valve unit 20 is provided inside the fuel tank 10.

A canister 22 is coupled to the differential pressure regulating valve 18 through a vapor line 24. A differential pressure regulating valve 26 is mounted to the canister 22. The differential pressure regulating valve 26 controls the opening and closing of an outside-air communication hole defined in the canister 22.

An opening-area variable device 28, which serves as a fuel evaporative-gas quantity varying means, a breather ventilation resistance varying means and an opening-area varying means, is provided at an intermediate portion of the breather 16. The opening-area variable device 28 adjusts the quantity of a fuel evaporative-gas which circulates in the breather 16.

Figure 2:
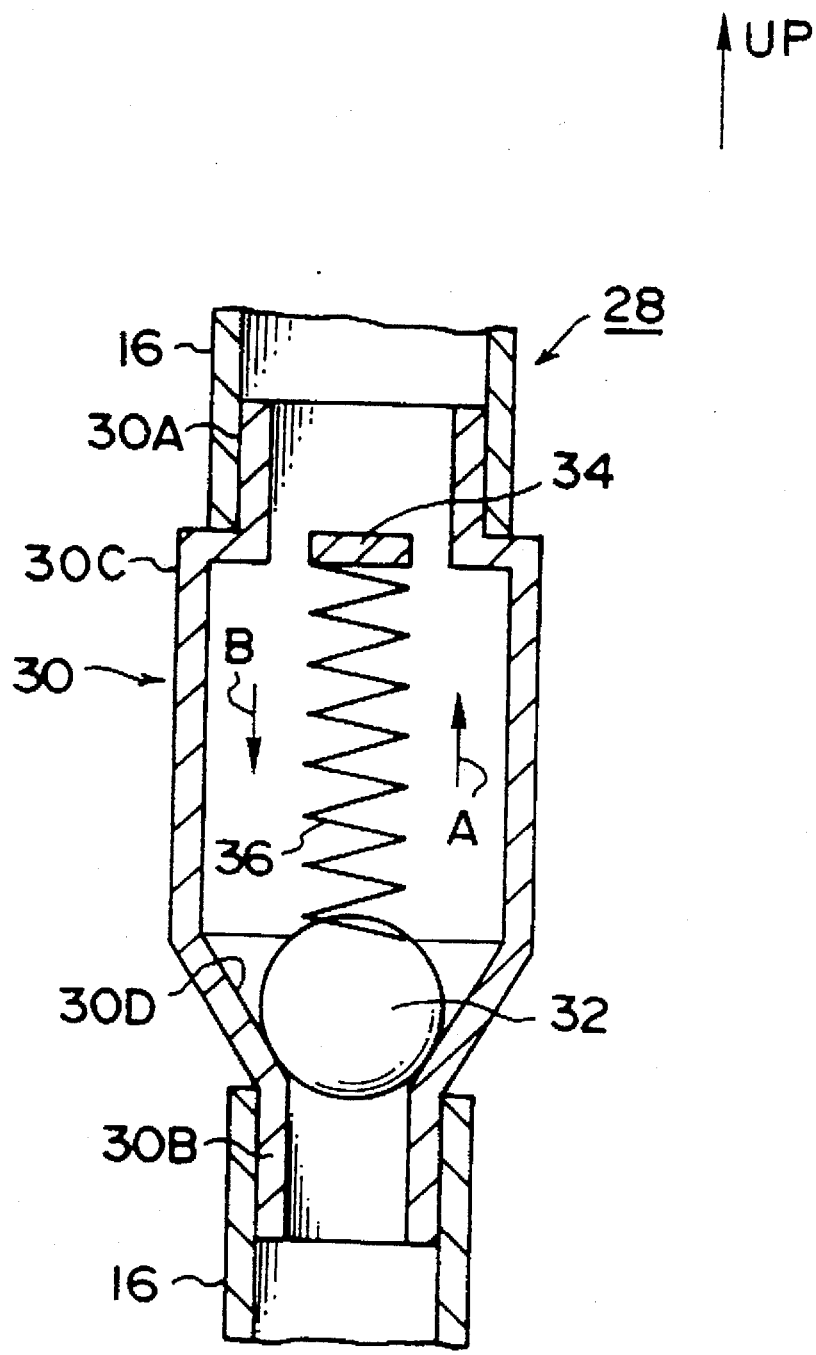
FIG. 2 is a sectional side view illustrating a fuel evaporative-gas quantity variable device employed in the fuel evaporative-gas emission preventing apparatus shown in FIG. 1.

As shown in FIG. 2, the opening-area variable device 28 has a pipe-shaped case 30 provided along upward and downward directions. The divided breathers 16 are respectively coupled to an upper end 30A and a lower end 30B of the case 30. The diameter of a vertically-extending intermediate portion 30C of the case 30 is set so as to be larger than the diameters of the upper and lower ends 30A and 30B. An inclined face 30D of the case 30 whose diameter is gradually decreased in a downward direction, is formed between the intermediate portion 30C and the lower end 30B. A spherical float valve 32 is inserted into the intermediate portion 30C so as to be movable along the upward and downward directions (i.e., in the directions indicated by arrows A and B in FIG. 2). The diameter of the float valve 32 is set so as to become larger than the internal diameters of the upper and lower ends 30A and 30B. When the float valve 32 moves downward, the area of an opening defined between the float valve 32 and the inclined face 30D is gradually narrowed so that a ventilation resistance is made great. Namely, the float valve 32 serves as a means for varying the ventilation resistance.

A stopper 34 protrudes from an inner peripheral portion of the upper end 30A. A compression coil spring 36 is inserted between the stopper 34 and the float valve 32. Thus, when the float valve 32 moves in the direction indicated by arrow A under an internal pressure of the fuel tank 10, the float valve 32 is shifted in the arrow A direction against its own weight and an urging force of the compression coil spring 36. Therefore, the quantity of change in area of the opening defined between the float valve 32 and the inclined face 30D with respect to the internal pressure of the fuel tank 10 can be adjusted by controlling the mass of the float valve 32 and the load of the compression coil spring 36.

When a fueling speed is of a high speed (e.g., 38 liter/min) in operation, the internal pressure of the fuel tank 10 increases. With the increase in internal pressure, the float valve 32 of the opening-area variable device 28 is displaced in the direction indicated by arrow A in FIG. 2 against its own weight and the urging force of the compression coil spring 36 so that the area of the opening defined between the float valve 32 and the inclined face 30D is enlarged. Therefore, the quantity of the fuel evaporative-gas that circulates in the breather 16, increases and the quantity of intake of fresh air from the outside of the inlet pipe 12 to the port 12B is reduced, whereby a fuel evaporative-gas newly generated within the fuel tank 10 is reduced. Accordingly, the quantity of adsorption of the canister 22 is decreased.

On the other hand, when the fueling speed is of a low speed (e.g., 15 liter/min), the internal pressure of the fuel tank 10 is reduced. With the reduction in internal pressure, the quantity of movement of the float valve 32 of the opening-area variable device 28 in the direction indicated by arrow A is reduced so that the area of the opening defined between the float valve 32 and the inclined face 30D is narrowed. Therefore, the quantity of the fuel evaporative-gas that circulates in the breather 16 can be prevented from excessively increasing. As a result, a vapor leak from the port 12B of the inlet pipe 12 can be reduced.

Thus, the quantity of adsorption of the canister can be set as low as possible by a single breather at any fueling speeds and an emission can be set so as to fall within the restricted value.

In the present embodiment, the opening-area variable device 28 was used as the breather ventilation resistance varying means. As an alternative, however, a structure for varying the length of a breather to change the quantity of a fuel evaporative-gas circulated in the breather may be adopted.

(Second embodiment)

A second embodiment of a fuel evaporative-gas emission preventing apparatus according to the present invention will now be described with reference to FIG. 3. Incidentally, the same elements of structure as those employed in the first embodiment are identified by like reference numerals and their description will therefore be omitted.

Figure 3:
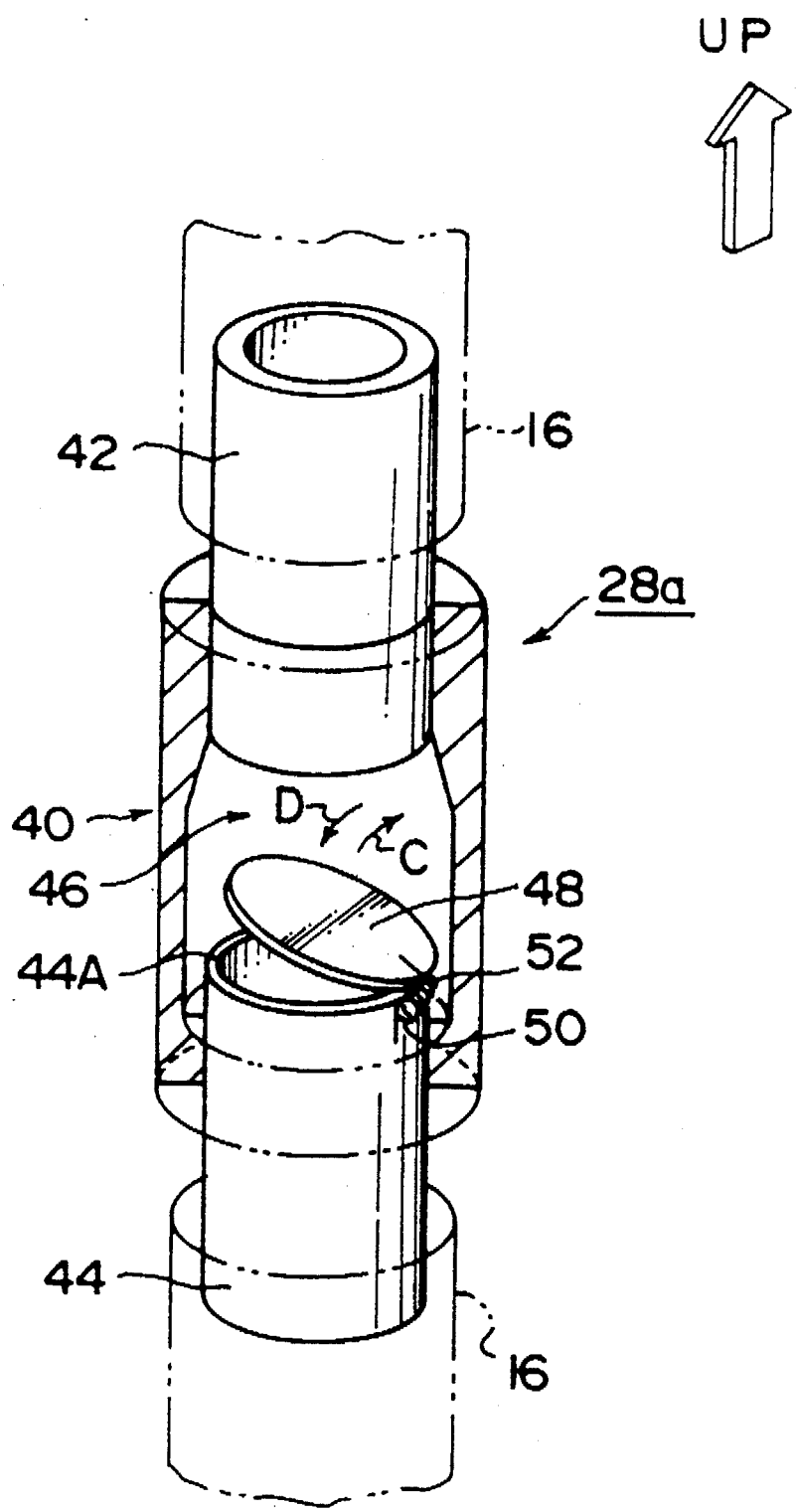
FIG. 3 is a perspective view, partly in section, showing a fuel evaporative-gas quantity variable device employed in a fuel evaporative-gas emission preventing apparatus according to a second embodiment of the present invention.

In the present embodiment as shown in FIG. 3, an opening-area variable device 28a has a pipe-like case 40 disposed along upward and downward directions. A pipe 42 whose diameter is made smaller than that of the case 40, is coupled to an upper portion of the case 40. Further, a pipe 44 whose diameter is made smaller than that of the case 40, is coupled to a lower portion of the case 40. A tip portion 44A of the pipe 44 is inserted into an internal space or cavity 48 defined in the case 40. Incidentally, divided breathers 16 are coupled to their corresponding pipes 42 and 44.

A valve 48 for closing a tip opening of the pipe 44 is attached to the tip portion 44A of the pipe 44 so as to be swingable in opening and closing directions (i.e., in the directions indicated by arrows C and D in FIG. 3) by a hinge 50. A torsion coil spring 52 is attached to the hinge 50. The torsion coil spring 52 urges the valve 48 in the closing direction (i.e., in the direction indicated by arrow D in FIG. 3). Thus, when the valve 48 moves in the arrow C direction under an internal pressure of a fuel tank 10, the valve 48 is swung in the direction indicated by arrow C against its own weight and an urging force of the torsion coil spring 52. Therefore, the quantity of change in opening area between the tip opening of the pipe 44 and the valve 48 with respect to the internal pressure of the fuel tank 10 can be adjusted by controlling the weight of the float valve 48 itself and the load of the torsion coil spring 52.

When a fueling speed is of a high speed in operation, the internal pressure of the fuel tank 10 increases. With the increase in internal pressure, the valve 48 of the opening-area variable device 28a is swung in the direction indicated by arrow C in FIG. 3 against its own weight and the urging force of the torsion coil spring 52 so that the opening area between the tip opening of the pipe 44 and the valve 48 is enlarged. Therefore, the quantity of a fuel evaporative-gas that circulates in the breather 16, increases and the quantity of intake of fresh air from the outside of an inlet pipe 12 to a port 12B is reduced, so that a new fuel evaporative-gas is not generated within the fuel tank 10. Accordingly, the quantity of adsorption of a canister is decreased.

On the other hand, when the fueling speed is of a low speed, the internal pressure of the fuel tank 10 is reduced. With the reduction in internal pressure, the quantity of swinging movement of the valve 48 of the opening-area variable device 28a in the direction indicated by arrow C is reduced so that the opening area between the tip opening of the pipe 44 and the valve 48 is narrowed. Therefore, the quantity of the fuel evaporative-gas that circulates in the breather 16, can be prevented from excessively increasing. As a result, a vapor leak from the port 12B of the inlet pipe 12 can be reduced.

Thus, the quantity of adsorption of the canister can be set as low as possible at any fueling speeds by a single breather and an emission can be set so as to fall within the restricted value.

(Third embodiment)

A third embodiment of a fuel evaporative-gas emission preventing apparatus according to the present invention will now be described with reference to FIGS. 4 and 5. Incidentally, the same elements of structure as those employed in the first embodiment are identified by like reference numerals and their description will therefore be omitted.

Figure 4:
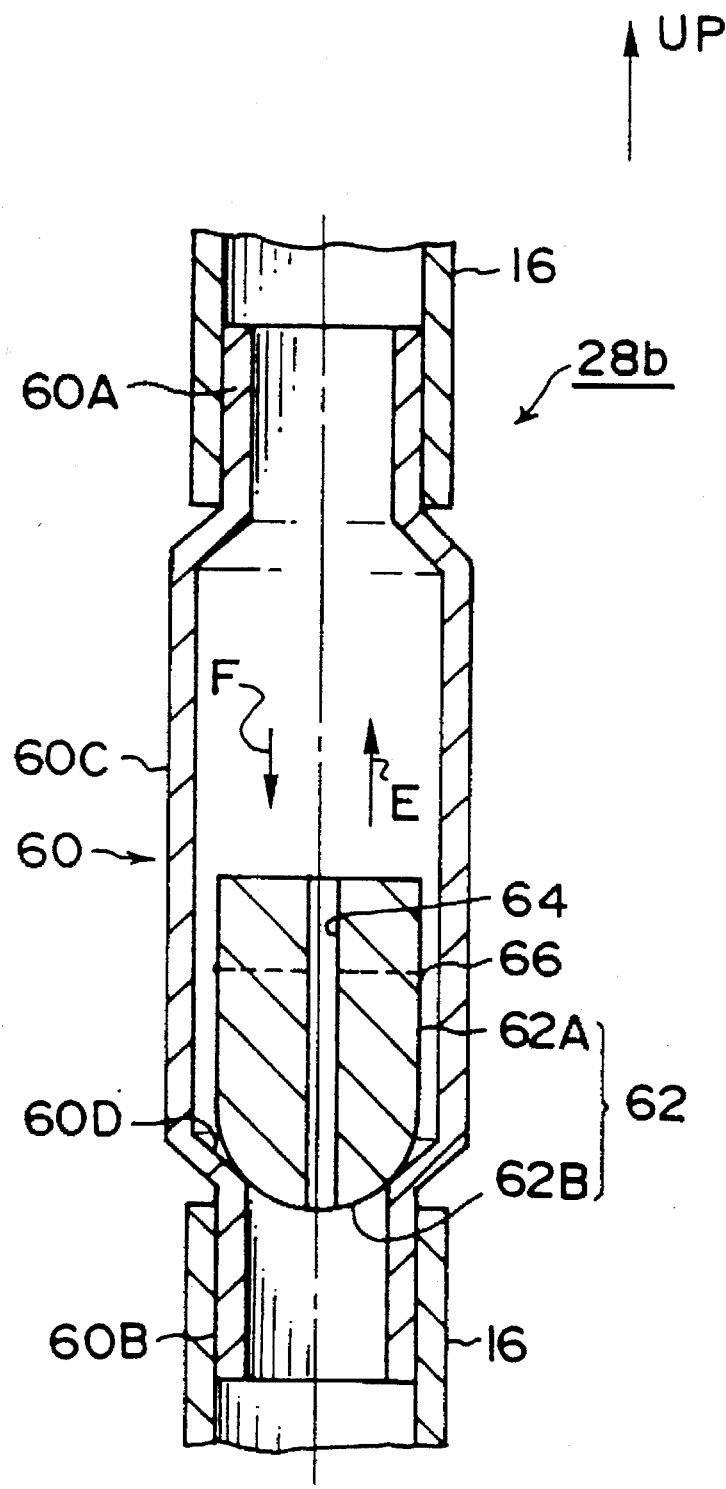
FIG. 4 is a sectional side view showing a fuel evaporative-gas quantity variable device employed in a fuel evaporative-gas emission preventing apparatus according to a third embodiment of the present invention.

As shown in FIG. 4, an opening-area variable device 28b employed in the present embodiment has a pipe-shaped case 60 disposed along upward and downward directions. Breathers 16 combined into one are respectively coupled to an upper end 60A and a lower end 60B of the case 60. The diameter of a vertically-extending intermediate portion 60C of the case 60 is larger than the diameters of the upper and lower ends 60A and 60B. An inclined face 60D whose diameter is gradually decreased in a downward direction, is formed between the intermediate portion 60C and the lower end 60B. A float valve 62 is inserted within the intermediate portion 60C so as to be movable in the upward and downward directions (i.e., in the directions indicated by arrow E and F in FIG. 4).

Figure 5:
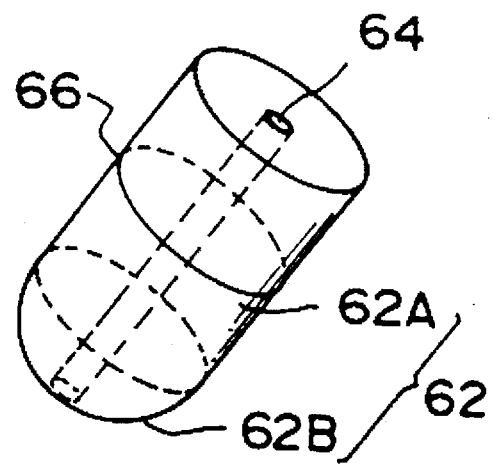
FIG. 5 is a perspective view showing a float valve employed in the fuel evaporative-gas quantity variable device of the fuel evaporative-gas emission preventing apparatus shown in FIG. 4.

As shown in FIG. 5, the float valve 62 has a base 62A shaped in the form of a cylinder. A head 62B is provided at a side end below the base 62A. The head 62B is shaped in the form of a semi-spherical projectile. Further, a through-hole 64 is defined in the float valve 62 so as to extend therethrough along the axis of the float valve 62.

As shown in FIG. 4, the axial diameter of the float valve 62 is set so as to be larger than that of each of the upper and lower ends 60A and 60B of the case 60. Thus, when the float valve 62 is displaced downward, the area of an opening defined between the float valve 62 and the inclined face 60D is gradually narrowed so that a ventilation resistance is increased.

Accordingly, when the float valve 62 is moved in the direction indicated by arrow E under an internal pressure of a fuel tank 10, the float valve 62 is shifted in the arrow E direction against its own weight. Therefore, the quantity of change in opening area between the float valve 62 and the inclined face 60D with respect to the internal pressure of the fuel tank 10 can be adjusted by controlling the mass of the float valve 62.

When a fueling speed is of a high speed in operation, the internal pressure of the fuel tank 10 increases. With the increase in internal pressure, the float valve 62 of the opening-area variable device 28b is shifted in the direction indicated by arrow E in FIG. 4 against its own weight, so that the opening area between the float valve 62 and the inclined face 60D is enlarged to increase the diameter of the corresponding breather. Therefore, the quantity of a fuel evaporative-gas circulated in the breather 16, increases and the quantity of intake of fresh air from the outside of an inlet pipe 12 to a port 12B is reduced, so that a new fuel evaporative-gas is not generated within the fuel tank 10. Accordingly, the quantity of adsorption of a canister is reduced.

On the other hand, when the fueling speed is of a low speed, the internal pressure of the fuel tank 10 is reduced. With the reduction in internal pressure, the quantity of movement of the float valve 62 of the opening-area variable device 28b in the direction indicated by arrow E is reduced so that the opening area between the float valve 62 and the inclined face 60D is narrowed, thereby reducing the diameter of the corresponding breather 16. Therefore, the quantity of the fuel evaporative-gas circulated in the breather 16 can be prevented from excessively increasing. As a result, a vapor leak from the port 12B of the inlet pipe 12 can be reduced.

Thus, in the fuel evaporative-gas emission preventing apparatus according to the third embodiment, the quantity of adsorption of the canister can be set as low as possible at any fueling speeds by a single breather and an emission can be also set so as to fall within the restricted value.

Since the float valve 62 is not spherical but projectile-shaped in the present embodiment, a parting line 66 (see FIGS. 4 and 5), which is produced when the float valve 62 is formed by a split pattern, can be formed on the base 62A out of the head 62B, which is brought into contact with the inclined face 60D and serves as a seal. Therefore, the parting line is in no fear of appearing at the seal as in the case where the float valve 62 is spherical. Thus, sealing properties are stabilized.

Further, since the through-hole 64 is defined in the float valve 62 in the present embodiment, the minimum quantity of ventilation can be set to a value greater than 0 by varying the diameter of the through-hole 64. Further, the quantity of ventilation at the time that the fueling speed is low, can be ensured. It is also unnecessary to provide a bypass for setting the minimum quantity of ventilation. Since it is unnecessary to define a cut-away portion for setting the minimum quantity of ventilation in the inclined face 60D or head 62B that serves as the seal, the sealing properties are not impaired.

Since the float valve 62 is projectile-shaped in the present embodiment, the mass of the float valve 62 can be adjusted by simply changing the length of the cylindrical base 62A without a change in its axial diameter, in other words, without being affected by the opening area of the corresponding breather 16. Therefore, the outer diameter of the case 60 does not increase beyond need as in the case where the float valve 62 is spherical. It is also unnecessary to provide an urging means such as a spring or the like to supplement a shortage of the mass of the float valve 62 as in the case where the float valve 62 is spherical. Therefore, the fuel evaporative-gas emission preventing apparatus can be reduced in size and weight, the number of parts employed in the apparatus can be reduced and the apparatus can be simplified in structure.

Figure 6:
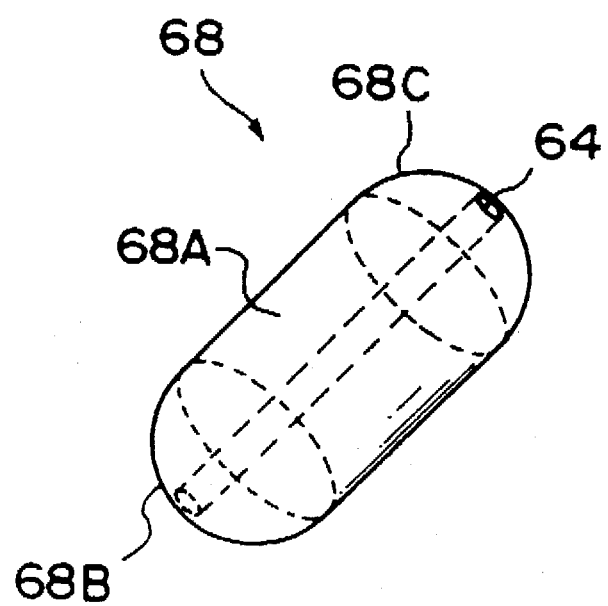
FIG. 6 is a perspective view illustrating another float valve employed in the fuel evaporative-gas quantity variable device of the fuel evaporative-gas emission preventing apparatus shown in FIG. 4.

In the present embodiment, the float valve 62 is shaped in the form of the projectile. As an alternative to this, however, a float valve 68 may be shaped in the form of a capsule with a base 68A thereof made as cylindrical and both ends 68B and 68C of the base 68A made as semispherical as shown in FIG. 6. Even if both ends are turned upside down in this case, they are not misassembled. Since no edges are formed on the outer periphery of the float valve 68, the float valve 68 can be smoothly moved as compared with the case where the float valve is projectile-shaped.

(Fourth embodiment)

A fourth embodiment of a fuel evaporative-gas emission preventing apparatus according to the present invention will now be described with reference to FIGS. 7 through 9. Incidentally, the same elements of structure as those employed in the first embodiment are identified by like reference numerals and their description will therefore be omitted.

Figure 7:
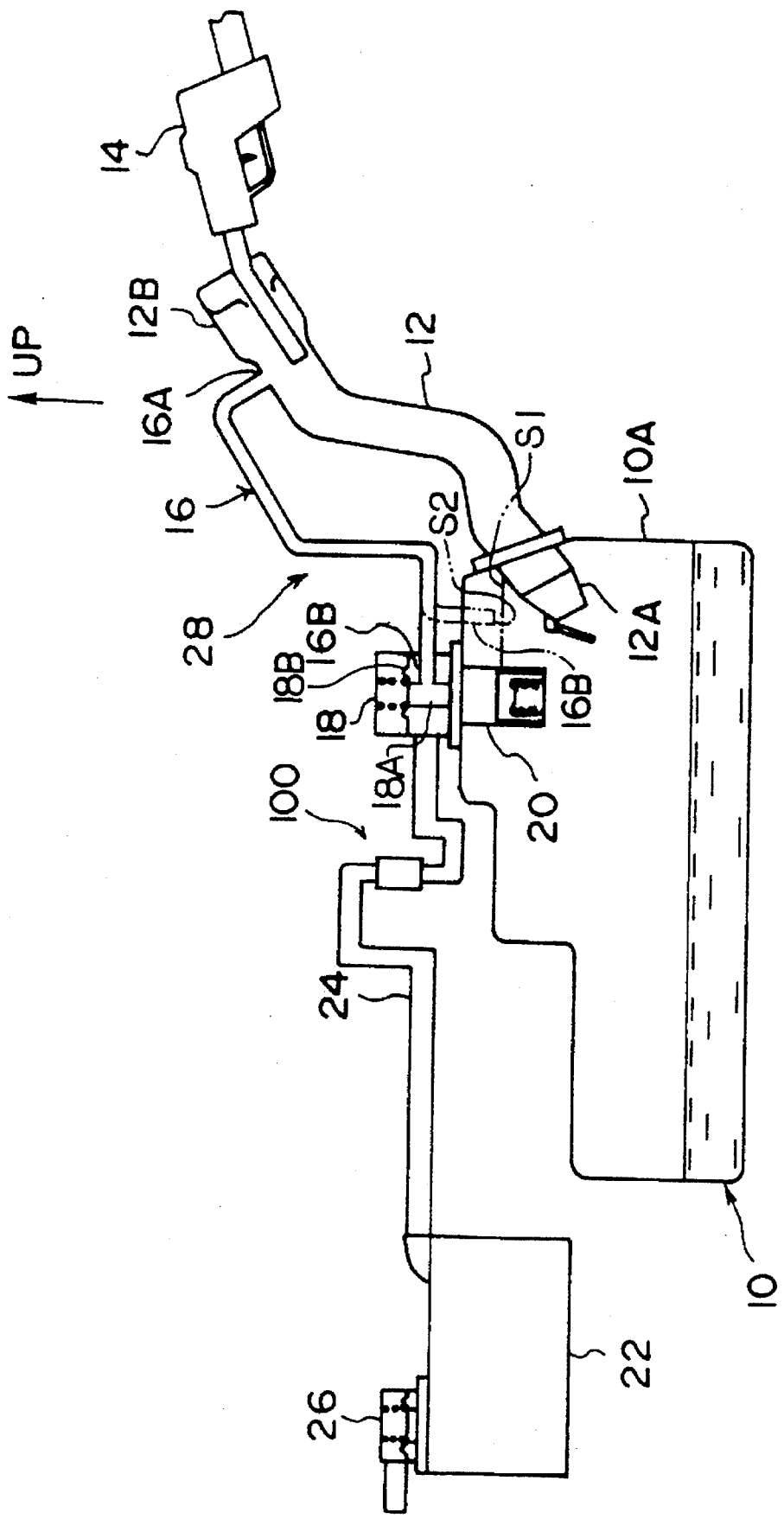
FIG. 7 is a block diagram depicting a fuel evaporative-gas emission preventing apparatus according to a fourth embodiment of the present invention.

In the fuel evaporative-gas emission preventing apparatus according to the present embodiment, the opening-area variable device 28 shown in FIG. 1 is not provided as illustrated in FIG. 7. An end 16B of a breather 16 reaches a portion 18A provided within a differential pressure regulating valve 18, which directly receives a tank internal pressure. Therefore, the breather 16 communicates with vapor lines 24 only when a diaphragm 18B in the differential pressure regulating valve 18 (connecting means) is open (when an internal pressure in the breather 16 is greater than that in the vapor lines 24).

Further, a vapor line ventilation resistance variable device 100 for varying a ventilation resistance of each vapor line 24 is provided between the vapor lines 24 for coupling the differential pressure regulating valve 18 and a canister 22 to each other.

Figure 8:
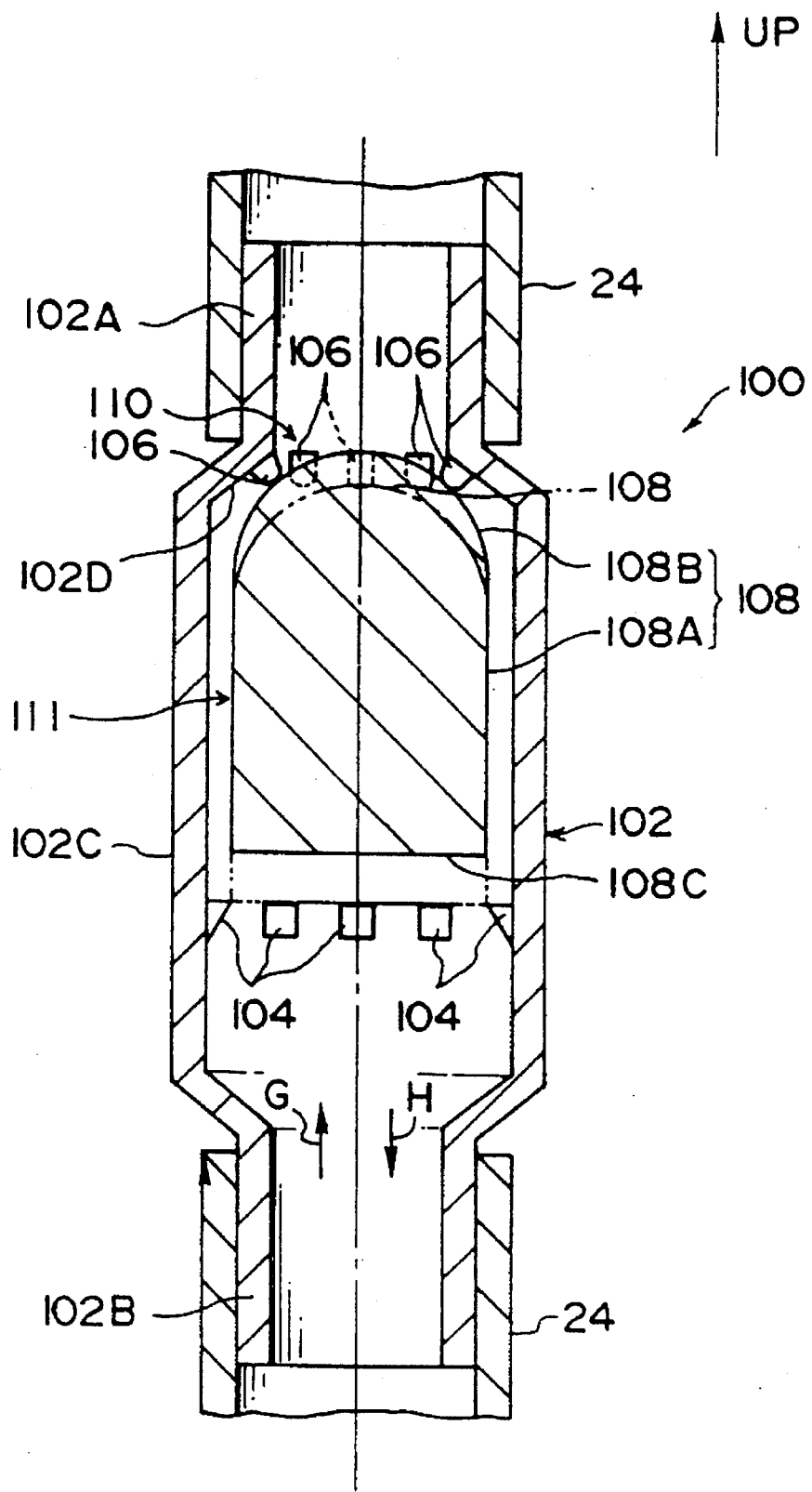
FIG. 8 is a sectional side view showing a vapor line ventilation resistance variable device employed in the fuel evaporative-gas emission preventing apparatus shown in FIG. 7.

As shown in FIG. 8, the vapor line ventilation resistance variable device 100 has a pipe-shaped case 102 disposed along upward and downward directions. The vapor lines 24 are respectively coupled to an upper end 102A and a lower end 102B of the case 102. The diameter of a vertically-extending intermediate portion 102C of the case 102 is set so as to become larger than the diameters of the upper and lower ends 102A and 102B. An inclined face 102D whose diameter is gradually reduced in the upward direction, is formed between the intermediate portion 102C and the upper end 102A.

A plurality of projections 104 are formed on the inner peripheral surface of the intermediate portion 102C along the circumferential direction at predetermined intervals. Further, a plurality of projections 106 are also formed on the inner peripheral surface of the inclined face 102D, which is located in the vicinity of an upper end thereof, along the circumferential direction at predetermined intervals. A float valve 108 is inserted between the projections 104 and the projections 106 in the intermediate portion 102C so as to be movable in the upward and downward directions (i.e., in the directions indicated by arrows G and H in FIG. 8).

The float valve 108 is shaped in the form of a projectile so that a base 108A thereof is formed as cylindrical and a head 108B provided at an upper side end of the base 108A is formed as semispherical. An axial diameter of the float valve 108 is set so as to become larger than an internal diameter of the upper end 102A of the case 102 and the diameter of a circle formed by circularly coupling inner side ends of the projections 104 to one another. When the float valve 108 is displaced downward, the float valve 108 is brought into contact with the projections 104. On the other hand, when the float valve 108 is displaced upward, the float valve 108 is brought into contact with the projections 106 with an interval 110 left between the inclined face 102D and the float valve 108. The interval 110 is narrower than an interval 111 defined between the float valve 108 and the intermediate portion 102C when the float valve 108 is located in a position (position indicated by an imaginary line in FIG. 8) therebelow. The float valve 108 is moved upward at a fueling speed V at which one desires to increase the quantity of a fuel evaporative-gas and is set so as to be brought into contact with the projections 106.

Thus, when the fueling speed reaches a predetermined fueling speed V and a flow rate in the vapor lines 24 reaches a predetermined value or more, the float valve 108 is displaced upward under a fluid pressure so as to contact the projections 106. As a result, the ventilation resistance of the vapor line ventilation resistance variable device 100 is abruptly raised.

When the fueling speed is raised in operation so as to reach the fueling speed V at which one desires to increase the quantity of the fuel evaporative-gas and the flow rate in the vapor lines 24 reaches the predetermined value or more, the float valve 108 is displaced upward so as to be brought into contact with the projections 106. Thus, the ventilation resistance of the vapor line ventilation resistance variable device 100 is suddenly raised. Since an internal pressure in a fuel tank 10 increases, the quantity of the fuel evaporative-gas circulated in the breather 16 is increased with the increase in internal pressure and the quantity of intake of fresh air from the outside of an inlet pipe 12 to an opening or port 12B is decreased, a fuel evaporative-gas newly generated within the fuel tank 10 is reduced. Accordingly, the quantity of adsorption of the canister 22 is reduced.

Figure 9:
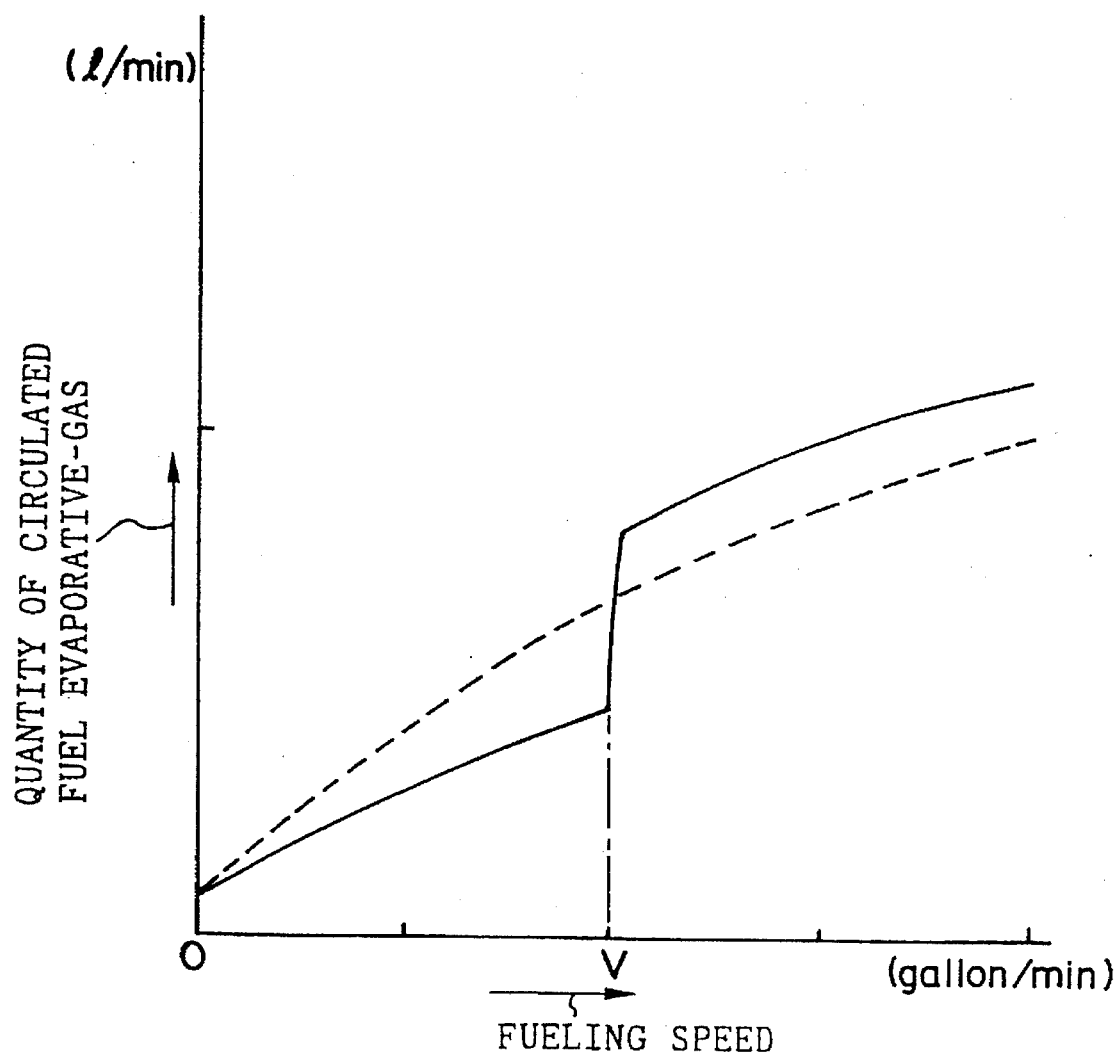
FIG. 9 is a graph showing the relationship between a fueling speed and the quantity of a fuel evaporative gas.

Thus, the fuel evaporative-gas emission preventing apparatus according to the fourth embodiment can abruptly increase the quantity of the fuel evaporative-gas at the fueling speed V as indicated by a solid line in FIG. 9. A broke line in FIG. 9 shows the relationship between the fueling speed and the quantity of the fuel evaporative-gas at the time that the vapor line ventilation resistance variable device 100 is not provided.

When the fueling speed is lower than the fueling speed V and the flow rate in the vapor lines 24 becomes lower than a predetermined value, the float valve 108 is displaced downward so as to make contact with the projections 104. Thus, the ventilation resistance of the vapor line ventilation resistance variable device 100 is abruptly decreased so that the internal pressure in the fuel tank 10 is lowered. It is therefore possible to prevent the quantity of the fuel evaporative-gas from excessively increasing. As a result, a vapor leak from the port 12B of the inlet pipe 12 can be reduced.

Thus, the quantity of adsorption of the canister can be reduced as low as possible at any fueling speeds by a single breather and an emission can be also set so as to fall within a restricted value.

In the present embodiment, the end 16B of the breather 16 reaches the portion 18A provided within the differential pressure regulating valve 18, which directly receives the tank internal pressure and the end 16B of the breather 16 communicates with the vapor lines 24 only when the diaphragm 18B in the differential pressure regulating valve 18 is open. Thus, when the internal pressure of the fuel tank 10 becomes greater than a valve-opening set pressure of the differential pressure regulating valve 18 due to a rise in temperature at the time that a vehicle is running or the heat received from the tank and only when the diaphragm 18B is opened, the fuel evaporative-gas flows into the canister 22. On the other hand, when the diaphragm 18B is closed, a passage through which the fuel evaporative-gas flows into the canister 22, is cut off. Accordingly, the quantity of adsorption of the canister 22 can be further reduced.

The end 16B of the breather 16 may be directly provided within the fuel tank 10 as indicated by an imaginary line in FIG. 7. In this case, a fuel level S1 at the time that the fuel tank 10 is full, may preferably be set to a level below an end face position S2 of the end 16B of the breather 16. This is because if there is no spot to let the fuel evaporative-gas escape, then the internal pressure in the fuel tank at the time that the tank is full, is normally raised to force out fuel toward the inlet pipe 12. On the other hand, since the spot to let the fuel evaporative-gas escape is ensured when the end face position S2 of the breather 16 goes higher than the full-tank fuel level S1, the fuel is not forced out toward the inlet pipe 12. Further, the distance between the full-tank fuel level S1 at auto-stop and the end face position S2 of the breather 16 is adjusted at each fuel tank. However, the distance therebetween may preferably be set to a distance equivalent to a capacity of 5% of the capacity of the fuel tank 10.

Since the float valve 108 is projectile-shaped in the present embodiment, the mass of the float valve 108 can be adjusted by simply changing the length of the cylindrical base 108A without a change in its axial diameter, in other words, without being affected by an opening area of each vapor line 24. Therefore, the outer diameter of the case 102 does not increase beyond need as in the case where the float valve is spherical. It is also unnecessary to provide an urging means such as a spring or the like in order to supplement a shortage of the mass of the float valve as in the case where the float valve is spherical. Therefore, the fuel evaporative-gas emission preventing apparatus can be reduced in size and weight, the number of parts employed in the apparatus can be reduced and the apparatus can be simplified in structure.

Figure 10:
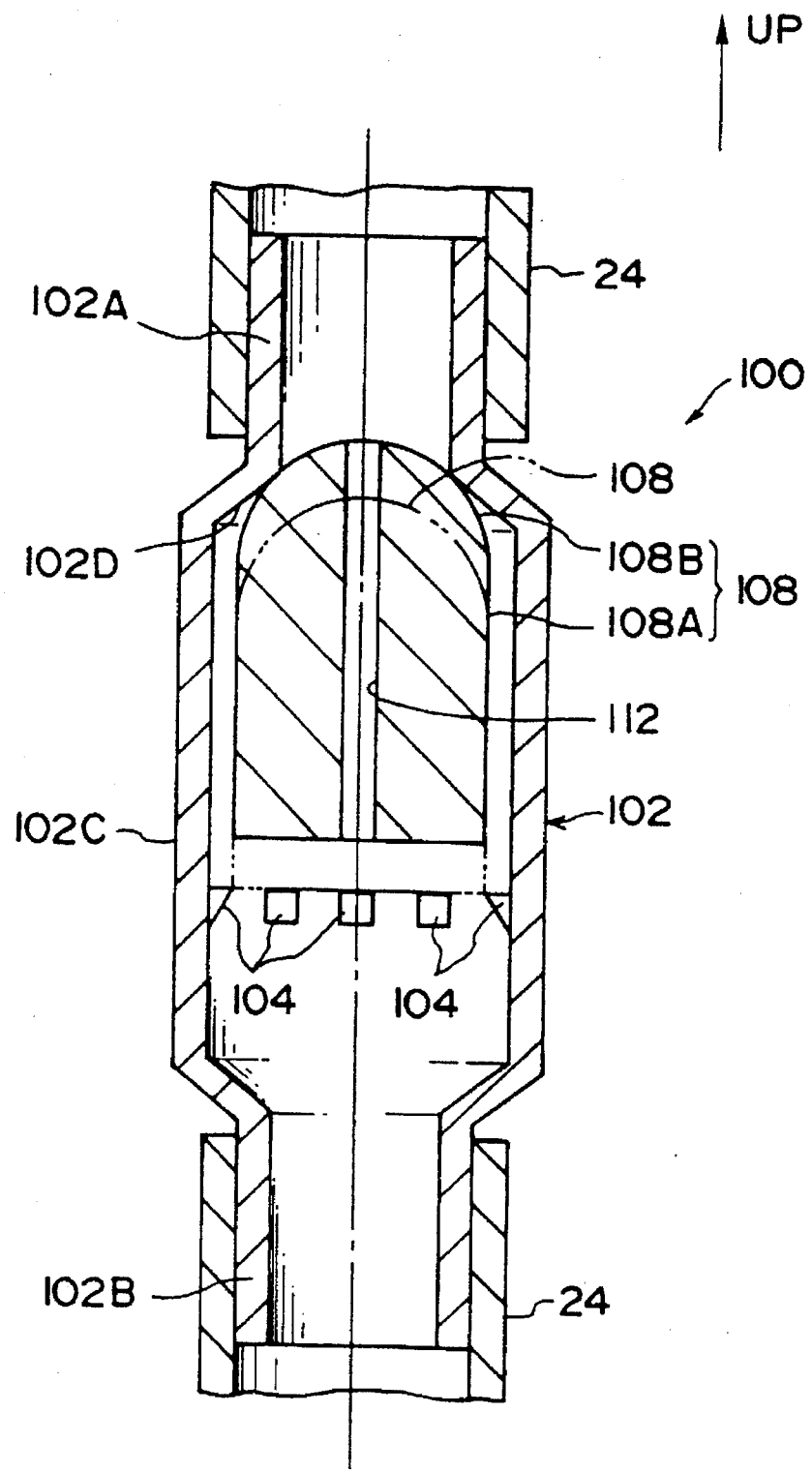
FIG. 10 is a sectional side view showing a vapor line ventilation resistance variable device employed in a fuel evaporative-gas emission preventing apparatus according to a modification of the fourth embodiment of the present invention.

As a modification of the present embodiment, a through-hole 112 may be defined in a float valve 108 along the axis thereof as shown in FIG. 10. It is, in this case, unnecessary to provide the projections 106 for setting the minimum quantity of ventilation between the inclined face 102D and the head 108B (see FIG. 8).

In the present embodiment, the float valve 108 is shaped in the form of the projectile. As an alternative to this, however, the float valve 108 may be shaped in the form of a capsule with a base thereof formed as cylindrical and both ends of the base formed as semispherical. Even if the float valve 108 is turned upside down in this case, it is not misassembled. Since no edges are formed on the outer periphery of the float valve 108, the float valve 108 can be smoothly moved as compared with the case where the float valve 108 is projectile-shaped.

Figure 11:
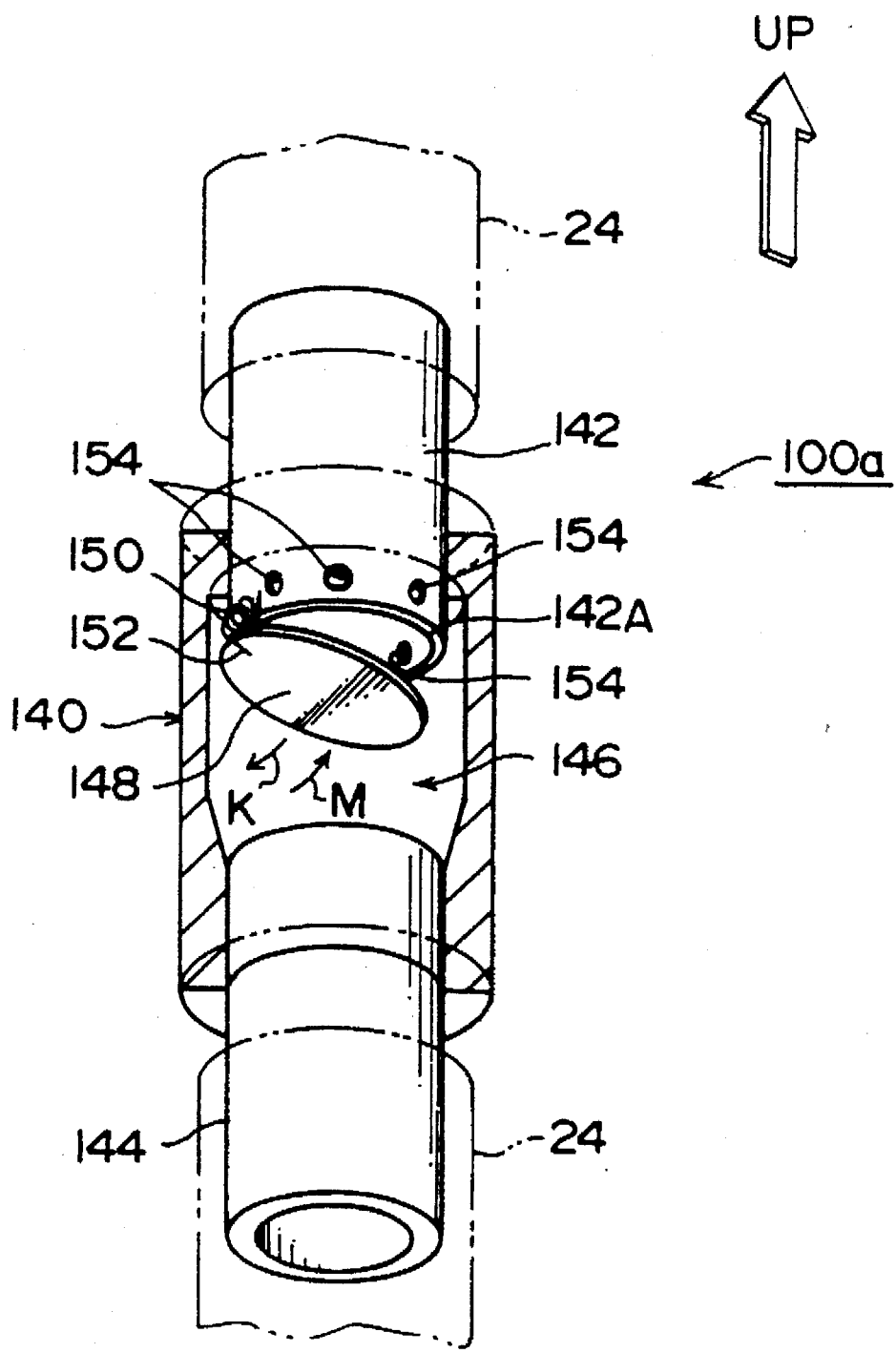
FIG. 11 is a perspective view, partly in section, illustrating a vapor line ventilation resistance variable device employed in a fuel evaporative-gas emission preventing apparatus according to another modification of the fourth embodiment of the present invention.

As another modification of the present embodiment, a vapor line ventilation resistance variable device 100a may be constructed as shown in FIG. 11. The vapor line ventilation resistance variable device 100a has a pipe-like case 140 disposed alone upward and downward directions. A pipe 142 whose diameter is smaller than that of the case 140, is coupled to an upper portion of the case 140. Further, a pipe 144 whose diameter is smaller than that of the case 140, is coupled to a lower portion of the case 140.

A lower end 142A of the pipe 142 is inserted within an internal space 146 of the case 140. Vapor lines 24 are respectively connected to the pipes 142 and 144. A valve 148 for closing a tip opening defined in the pipe 142 is attached to the lower end 142A of the pipe 142 so as to be swingable in opening and closing directions (i.e., in the directions indicated by arrows K and M in FIG. 11) by a hinge 150. The hinge 150 is provided with a torsion coil spring 152, which urges the valve 148 in the closing direction (i.e., in the direction indicated by arrow M in FIG. 11). Small-diameter through-holes 154 are defined in the vicinity of the lower end 142A of the pipe 142 along the circumferential direction of the pipe 142 at predetermined intervals.

Thus, in the present modification, when the fueling speed is made fast and the flow rate in the vapor lines 24 becomes greater than a predetermined value, the valve 148 is swung in the arrow M direction under a fluid pressure so that the tip opening of the pipe 142 is closed. As a result, the ventilation resistance of the vapor line ventilation resistance variable device 100a is abruptly increased because a fuel evaporative-gas passes through the through-holes 154 alone. Therefore, the quantity of the fuel evaporative-gas that circulates in the breather 16, is suddenly increased so that the quantity of intake of fresh air from the outside of the inlet pipe 12 to the port 12B is reduced, thus generating no new fuel evaporative-gas within the fuel tank 10. Accordingly, the quantity of adsorption of the canister is reduced.

On the other hand, when the fueling speed is made slow and the flow rate in the vapor lines 24 becomes smaller than the predetermined value, the valve 148 is swung in the arrow K direction by an urging force of the coil spring 152 to open the tip opening of the pipe 142. Thus, since the fuel evaporative-gas passes through the opening of the pipe 142 and the through-holes 154, the ventilation resistance of the vapor line ventilation resistance variable device 100a is abruptly lowered so as to reduce the internal pressure in the fuel tank 10. Therefore, the quantity of the fuel evaporative-gas can be prevented from excessively increasing. As a result, a vapor leak from the port 12B of the inlet pipe 12 can be reduced.

Figure 12:
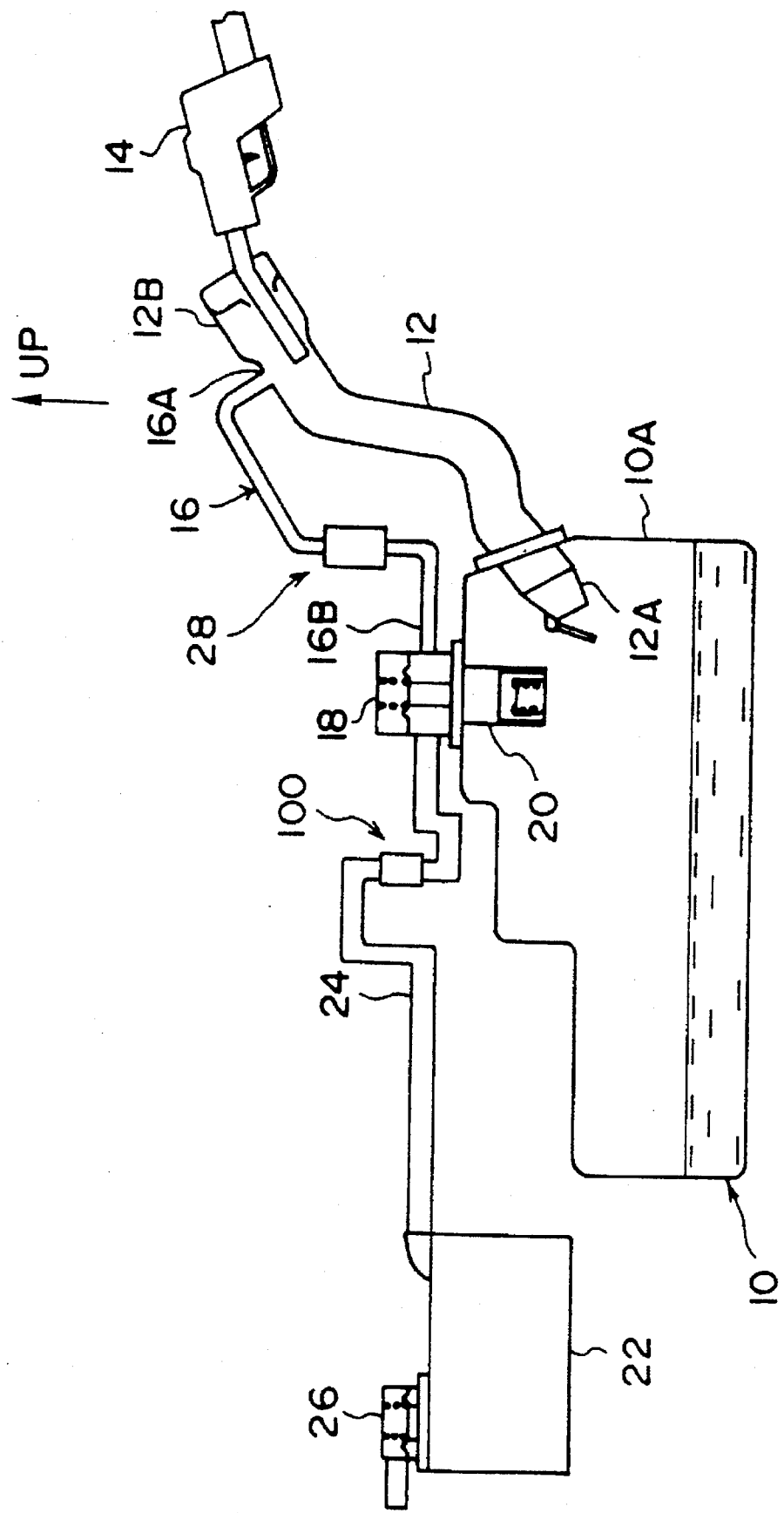
FIG. 12 is a block diagram depicting a fuel evaporative-gas emission preventing apparatus according to other embodiment of the present invention.
Figure 13:
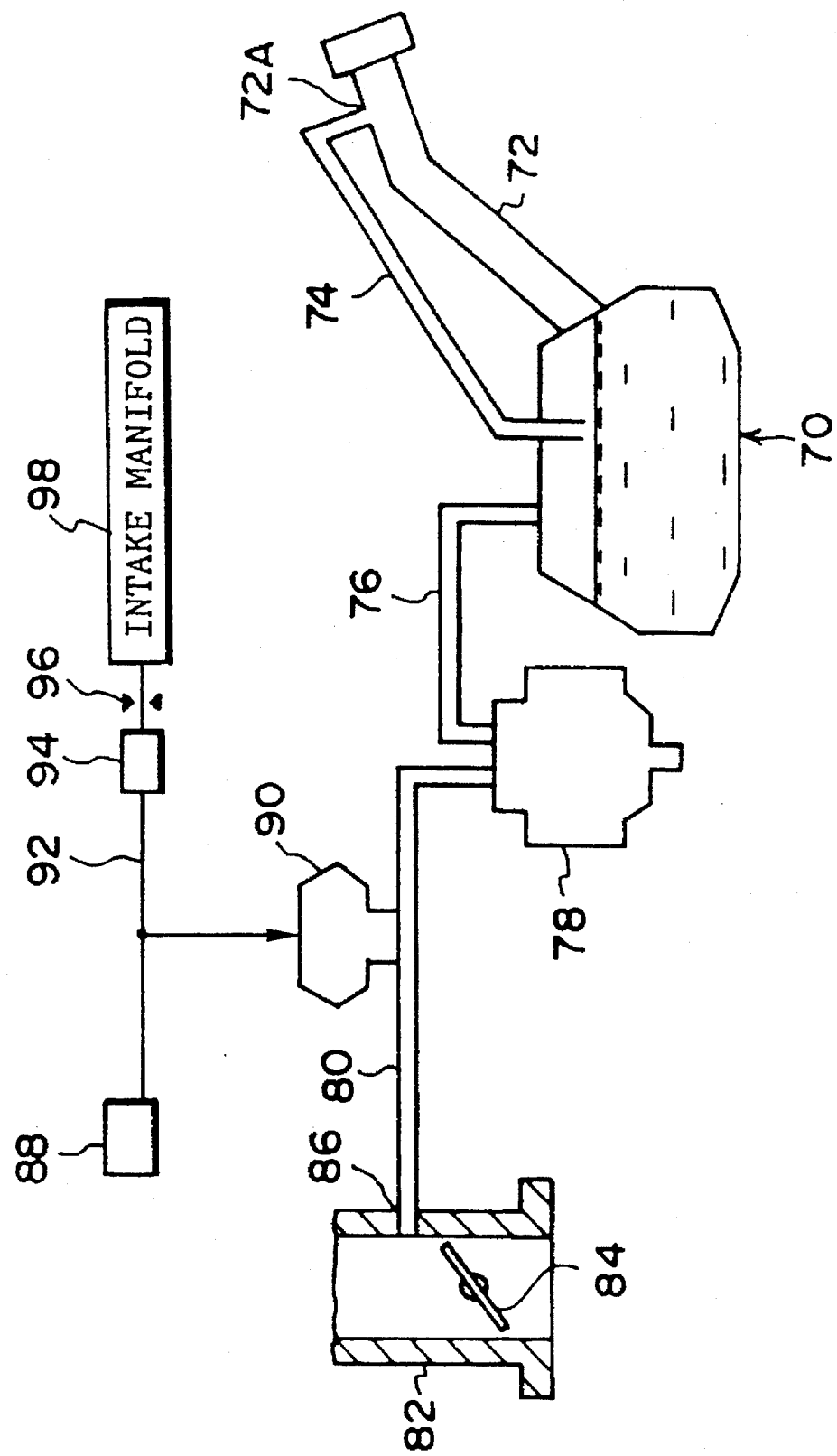
FIG. 13 is a block diagram showing a fuel evaporative-gas emission preventing apparatus according to a prior art.
Figure 14:
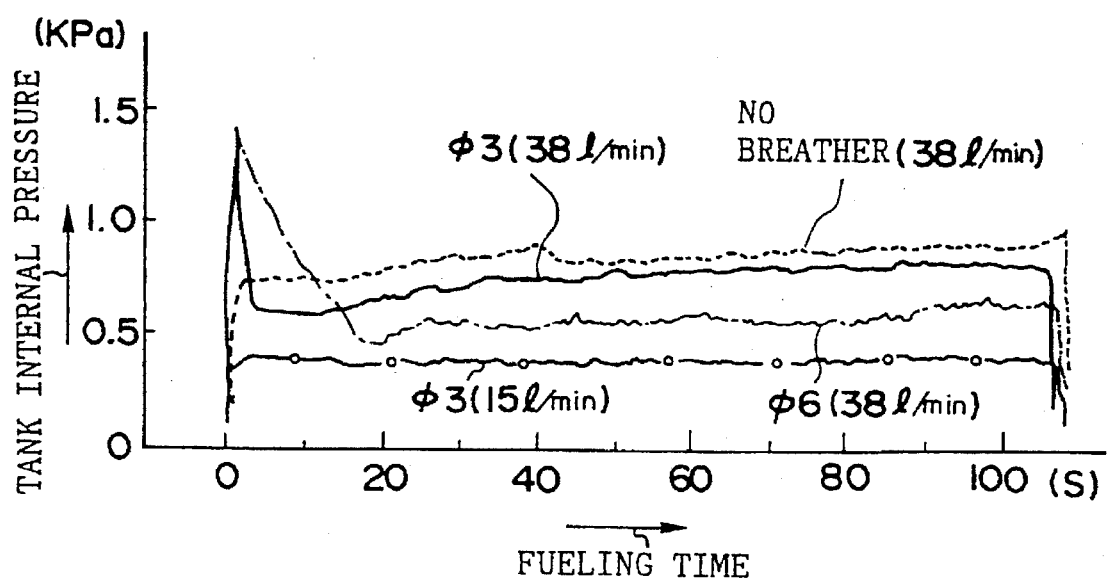
FIG. 14 is a graph illustrating the relationship between a fueling time, the diameter of a breather and an internal pressure of a tank.
Figure 15:
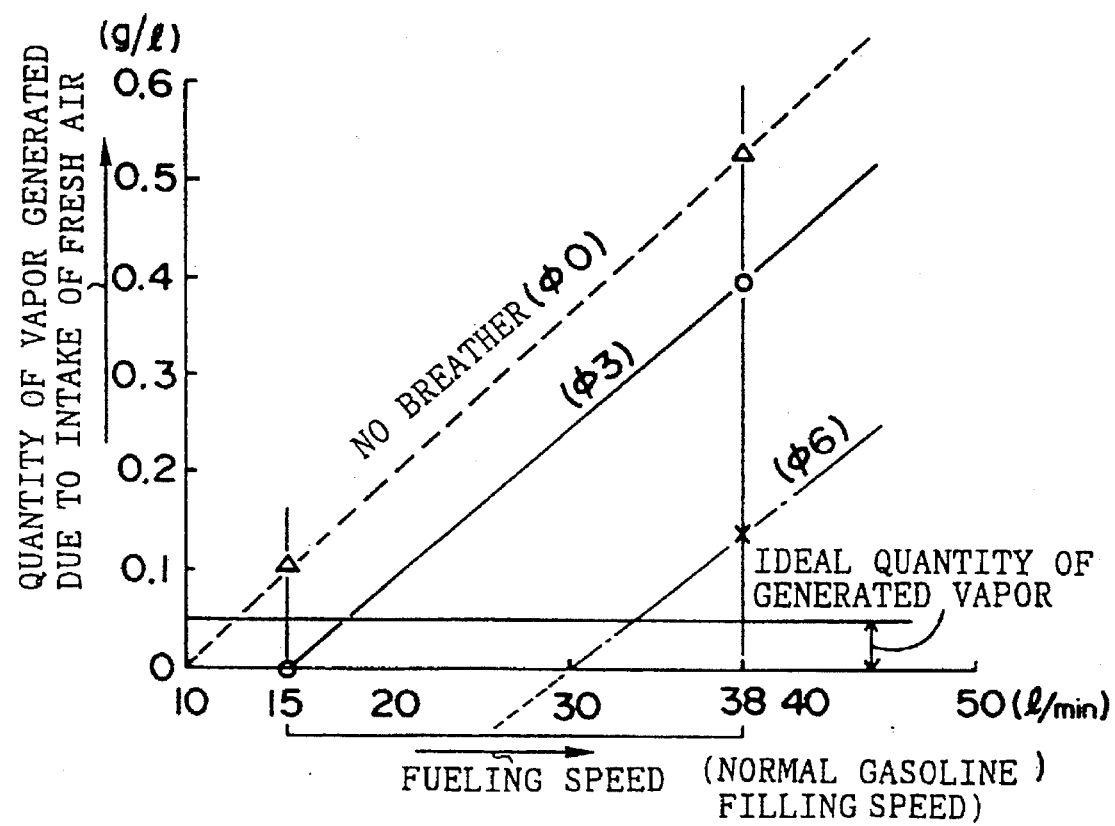
FIG. 15 is a graph showing the relationship between a fueling time, the diameter of a breather and the quantity of a fuel evaporative-gas generated incident to the intake of fresh air.
Figure 16:
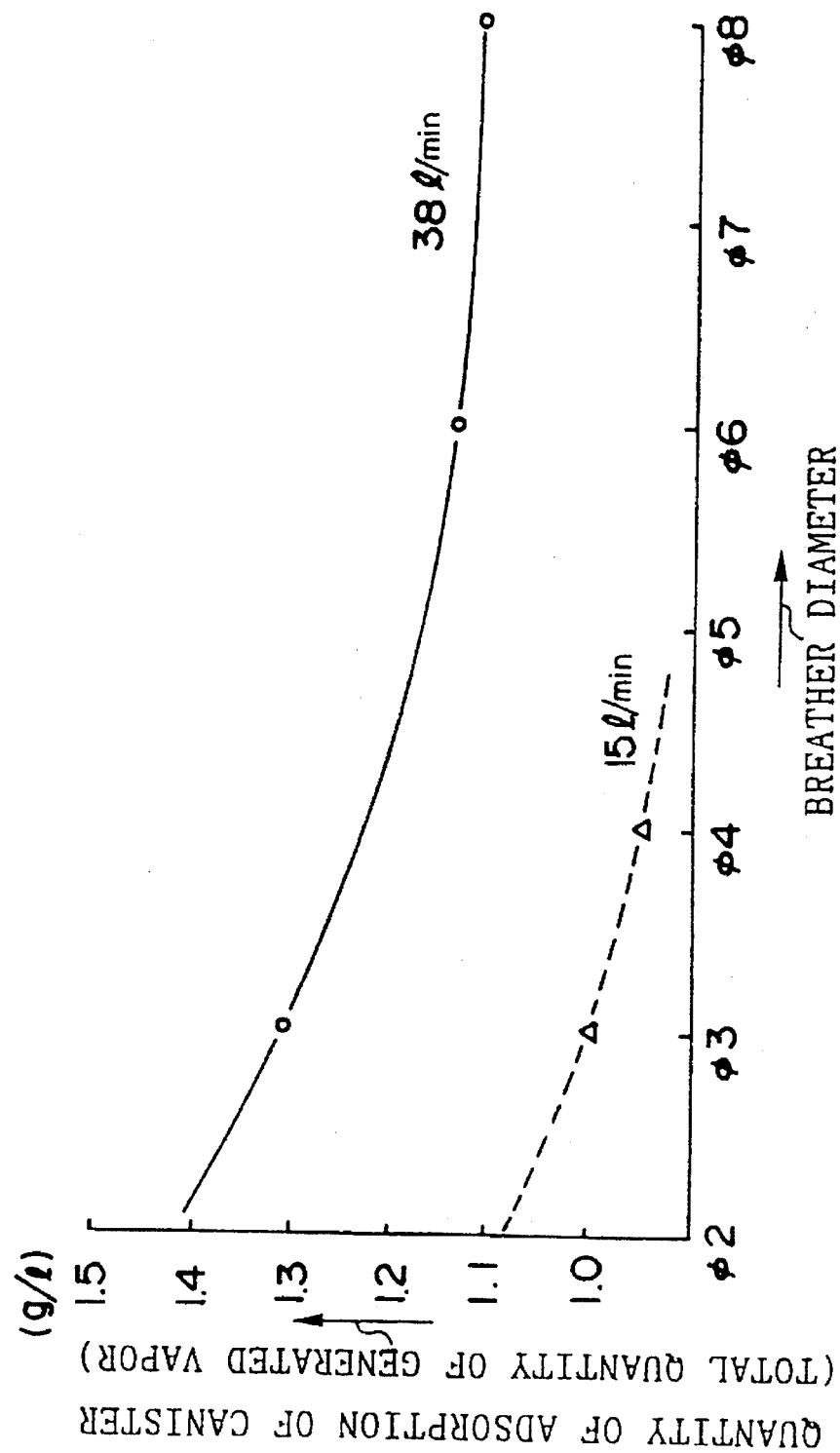
FIG. 16 is a graph depicting the relationship between the diameter of a breather and the quantity of adsorption of a canister.
Figure 17:
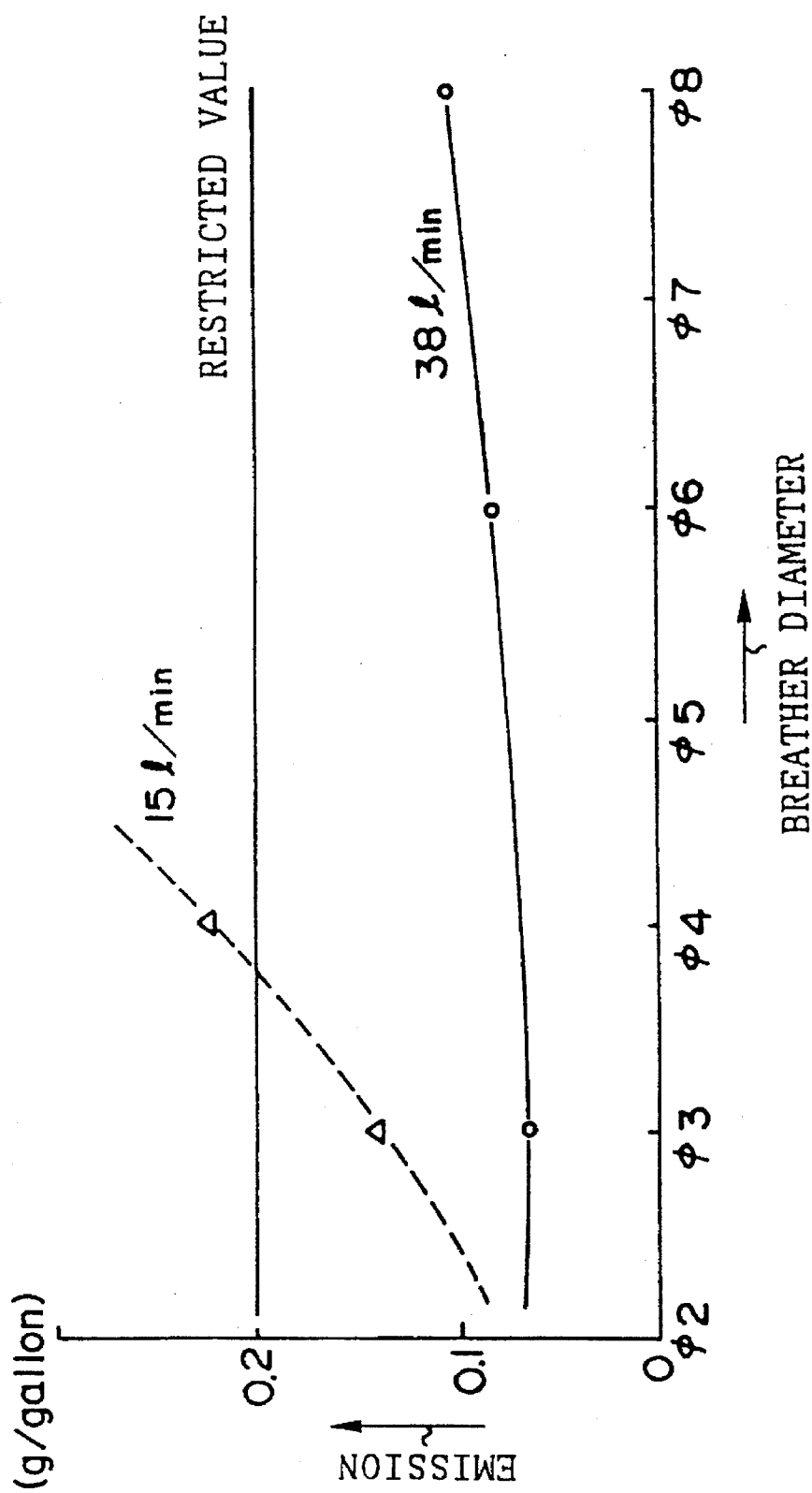
FIG. 17 is a graph showing the relationship between the diameter of a breather and an emission.

In the fuel evaporative-gas emission preventing apparatus of the present invention, both the opening-area variable device 28 described in the first through third embodiments and the vapor line ventilation resistance variable device 100 described in the fourth embodiment may be provided as shown in FIG. 12. In this case, the quantity of a fuel evaporative-gas can be changed quicker.

Having now fully described the invention, it will be apparent to those skilled in the art that many changes and modifications can be made without departing from the spirit or scope of the invention as set forth herein.

What is claimed is:

1. A fuel evaporative-gas emission preventing apparatus comprising:

a fuel tank;

a breather for coupling the inside of said fuel tank and a neighborhood of a fuel-supply port of said fuel tank to each other;

a canister for adsorbing a fuel evaporative-gas generated within said fuel tank;

a vapor line for coupling said fuel tank and said canister to each other; and vapor line ventilation resistance varying means for varying a ventilation resistance of said vapor line so that a quantity of a fuel evaporative-gas in said breather is substantially identical to a quantity of intake of air into said fuel tank by fueling.

2. A fuel evaporative-gas emission preventing apparatus according to claim 1, wherein said vapor line ventilation resistance varying means is provided between said vapor line.

3. A fuel evaporative-gas emission preventing apparatus according to claim 2, wherein said vapor line ventilation resistance varying means is opening-area varying means for varying an area of an opening defined in said vapor line according to an internal pressure in said breather.

4. A fuel evaporative-gas emission preventing apparatus according to claim 3, wherein said opening-area varying means is a valve.

5. A fuel evaporative-gas emission preventing apparatus according to claim 2, further comprising:

connecting means for connecting said breather and said vapor lines to one another.

6. A fuel evaporative-gas emission preventing apparatus according to claim 5, wherein said connecting means is a differential pressure regulating valve.

7. A fuel evaporative-gas emission preventing apparatus according to claim 6, wherein said differential pressure regulating valve opens when the internal pressure in said breather is greater than an internal pressure in said vapor line.

8. A fuel evaporative-gas emission preventing apparatus according to claim 2, wherein said vapor line ventilation resistance varying means includes:

a pipe provided in a substantially vertical direction and having a small-diameter portion near at least one end thereof and an inclined face;

a plurality of first projections formed along an inner periphery of an inclined face of an upper end of said pipe;

a plurality of second projections formed along an inner periphery of said pipe, which is provided between both ends of said pipe; and a float valve held between said plurality of first projections and said plurality of second projections.

9. A fuel evaporative-gas emission preventing apparatus according to claim 8, wherein an end of said float valve, which faces said plurality of first projections, has a semispherical shape.

10. A fuel evaporative-gas emission preventing apparatus according to claim 9, wherein when the internal pressure in said vapor lines is greater than a predetermined value, a ventilation resistance of said vapor line ventilation resistance varying means is abruptly raised when said float valve is brought into contact with said plurality of first projections.

11. A fuel evaporative-gas emission preventing apparatus according to claim 2, wherein an end of said breather is provided so as to directly receive an internal pressure in said fuel tank.

12. A fuel evaporative-gas emission preventing apparatus according to claim 11, wherein the end of said breather is provided above a fuel level at the time that said fuel tank is full.

13. A fuel evaporative-gas emission preventing apparatus according to claim 2, wherein said vapor line ventilation resistance varying means includes:

a pipe provided in a substantially vertical direction and having a small-diameter portion near at least one end thereof and an inclined face;

a plurality of projections formed along an inner periphery of said pipe, which is provided between both ends of said pipe; and a float valve having an end on the projections side, which has a semispherical shape, and a ventilation hole defined therein along an axial direction thereof, said float valve being held between an inclined face of an upper end of said pipe and said plurality of projections.

14. A fuel evaporative-gas emission preventing apparatus according to claim 13, wherein said float valve has a semispherically-shaped end provided on the side opposite to the end facing said projections.

15. A fuel evaporative-gas emission preventing apparatus comprising:

a fuel tank;

a breather for coupling the inside of said fuel tank and a neighborhood of a fuel-feed port of said fuel tank to each other;

a canister for adsorbing a fuel evaporative-gas generated within said fuel tank;

a vapor line for coupling said fuel tank and said canister to each other; and fuel evaporative-gas quantity varying means for varying a quantity of a fuel evaporative-gas circulated in said breather so as to be substantially identical to a quantity of intake of air into said fuel tank by fueling; and vapor line ventilation resistance varying means for varying a ventilation resistance of said vapor line so that the quantity of the fuel evaporative-gas circulated in said breather is substantially identical to the quantity of intake of air into said fuel tank by fueling.

16. A fuel evaporative-gas emission preventing apparatus according to claim 15, wherein said fuel evaporative-gas quantity varying means is mounted in said breather and said vapor line ventilation resistance varying means is provided in said vapor line.

17. A fuel evaporative-gas emission preventing apparatus according to claim 16, wherein said breather ventilation resistance varying means is first opening-area varying means for varying an area of an opening defined in said breather according to an internal pressure in said fuel tank and said vapor line ventilation resistance varying means is second opening-area varying means for varying an area of an opening defined in said vapor line according to an internal pressure in said breather.

18. A fuel evaporative-gas emission preventing apparatus according to claim 16, wherein said first opening-area varying means and said second opening-area varying means are respectively valves.

19. comprising:

a fuel tank;

a breather for coupling the inside of a fuel tank and a neighborhood of the fuel-feed port of said fuel tank to each other;

a canister for adsorbing a fuel evaporative-gas generated within said fuel tank; and fuel evaporative-gas quantity varying means for varying a quantity of a fuel evaporative-gas circulated in the breather so as to be substantially identical to a quantity of intake of air into said fuel tank by fueling, wherein said fuel evaporative-gas quantity varying means is mounted in said breather, and wherein said fuel evaporative-gas quantity varying means is breather ventilation resistance varying means for varying a ventilation resistance of said breather.

20. A fuel evaporative-gas emission preventing apparatus according to claim 19, wherein said breather ventilation resistance varying means is opening-area varying means for varying an area of an opening defined in said breather according to an internal pressure in said fuel tank.

21. A fuel evaporative-gas emission preventing apparatus according to claim 20, wherein said opening-area varying means is a valve.

22. A fuel evaporative-gas emission preventing apparatus according to claim 20, wherein said opening-area varying means includes:

a pipe having a small-diameter portion near at least one end thereof and an inclined face; and a float valve accommodated in the pipe.

23. A fuel evaporative-gas emission preventing apparatus according to claim 22, wherein said float valve has a spherical shape.

24. A fuel evaporative-gas emission preventing apparatus according to claim 22, wherein said float valve has a ventilation hole defined therein along the axial direction thereof.

25. A fuel evaporative-gas emission preventing apparatus according to claim 24, wherein said float valve has one end having a semispherical shape.

26. A fuel evaporative-gas emission preventing apparatus according to claim 24, wherein said float valve has both ends each having a semispherical shape.

* * * * *